(12) United States Patent
Widmer

(10) Patent No.: US 6,978,416 B2
(45) Date of Patent: Dec. 20, 2005

(54) ERROR CORRECTION WITH LOW LATENCY FOR BUS STRUCTURES

(75) Inventor: Albert X. Widmer, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 10/323,520

(22) Filed: Dec. 19, 2002

(65) Prior Publication Data

US 2004/0123222 A1 Jun. 24, 2004

(51) Int. Cl.[7] .................. H03M 13/21; H03M 13/19
(52) U.S. Cl. ................. 714/800; 714/4; 714/712; 714/757; 714/777
(58) Field of Search ................. 714/757, 777, 714/800, 4, 712; H03M 13/19, 13/21

(56) References Cited

U.S. PATENT DOCUMENTS

| | | | |
|---|---|---|---|
| 4,486,739 A | 12/1984 | Franaszek et al. | 340/347 |
| 5,740,186 A | 4/1998 | Widmer | 371/37.1 |
| 5,784,387 A * | 7/1998 | Widmer | 714/752 |
| 6,198,413 B1 | 3/2001 | Widmer | 341/59 |
| 6,496,540 B1 * | 12/2002 | Widmer | 375/242 |

OTHER PUBLICATIONS

U.S. Appl. No. 10/091,673, "DC-Balanced 7B/8B, 9B/10B, and Partitioned DC-Balanced 12/B/14B, 17B/20B, and 16B/18B Transmission Codes.".

"Proposal for a Very Short Reach (VSR) OC-192/STM-64 Interface Based on Parallel Optics," Optical Internetworking Forum (OIF), Los Angeles, CA, Contribution No. OIF-99, 120 (Oct. 19-20, 1999).

* cited by examiner

Primary Examiner—R. Stephen Dildine
(74) Attorney, Agent, or Firm—Ryan, Mason & Lewis, LLP

(57) ABSTRACT

Correction and location information are determined from a number of data vectors. The location information comprises values determined from subsets of the data vectors. Two or more of the subsets have one or more data vectors in common, but also have one or more data vectors, in one or more of the subsets, that are not in other subsets. The subsets comprise groups of data vectors, and the groups of data vectors have a size that is a function of a power of two. Transmission codes are used on the data vectors and correction and location information. Received location information and determined location information are compared to determine a data vector having an error. Received correction information and determined correction information are compared to correct the data vector having the error. Failing optical lanes may be replaced efficiently by using a number of multiplexers coupled to electrical lanes and optical lanes.

35 Claims, 7 Drawing Sheets

FIG. 4

| | | | | | | | | |
|---|---|---|---|---|---|---|---|---|
| $D_0$ | $D_1$ | $D_2$ | ⋯ | $D_{m-2}$ | $D_{m-1}$ | C | L | |
| $A_0$ | $A_1$ | $A_2$ | ⋯ | $A_{m-2}$ | $A_{m-1}$ | $A_C$ | $A_L$ | |
| $B_0$ | $B_1$ | $B_2$ | ⋯ | $B_{m-2}$ | $B_{m-1}$ | $B_C$ | $B_L$ | |
| $C_0$ | $C_1$ | $C_2$ | ⋯ | $C_{m-2}$ | $C_{m-1}$ | $C_C$ | $C_L$ | |
| $D_0$ | $D_1$ | $D_2$ | ⋯ | $D_{m-2}$ | $D_{m-1}$ | $D_C$ | $D_L$ | |
| $E_0$ | $E_1$ | $E_2$ | ⋯ | $E_{m-2}$ | $E_{m-1}$ | $E_C$ | $E_L$ | |

400, 410, 420, 430

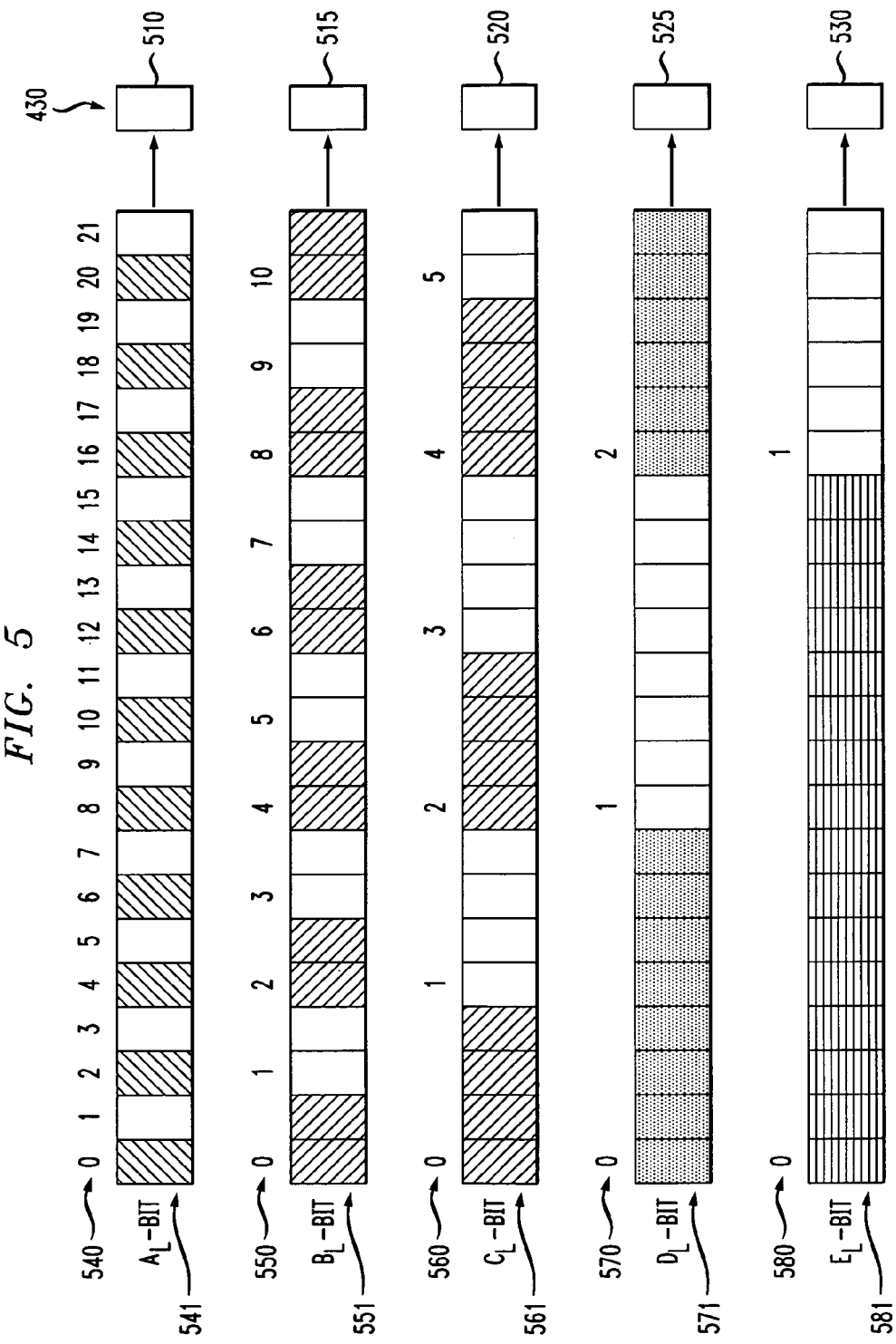

FIG. 6

| L0 | L1 | L2 | L3 | L4 | L5 | L6 | L7 | L8 | L9 |
|---|---|---|---|---|---|---|---|---|---|
| $a_{00}$ | $a_{10}$ | $a_{20}$ | $a_{30}$ | | | | | | |
| $b_{00}$ | $b_{10}$ | $b_{20}$ | $b_{30}$ | | | | | | |
| $c_{00}$ | $c_{10}$ | $c_{20}$ | $c_{30}$ | | | | | | |
| $d_{00}$ | $d_{10}$ | $d_{20}$ | $d_{30}$ | $a_{41}$ | $a_{51}$ | $a_{61}$ | $a_{71}$ | $a_{C01}$ | |
| $e_{00}$ | $e_{10}$ | $e_{20}$ | $e_{30}$ | $b_{41}$ | $b_{51}$ | $b_{61}$ | $b_{71}$ | $b_{C01}$ | |
| $i_{00}$ | $i_{10}$ | $i_{20}$ | $i_{30}$ | $c_{41}$ | $c_{51}$ | $c_{61}$ | $c_{71}$ | $c_{C01}$ | |
| $a_{02}$ | $a_{12}$ | $a_{22}$ | $a_{32}$ | $d_{41}$ | $d_{51}$ | $d_{61}$ | $d_{71}$ | $d_{C01}$ | $a_{L01}$ |
| $b_{02}$ | $b_{12}$ | $b_{22}$ | $b_{32}$ | $e_{41}$ | $e_{51}$ | $e_{61}$ | $e_{71}$ | $e_{C01}$ | $b_{L01}$ |
| $c_{02}$ | $c_{12}$ | $c_{22}$ | $c_{32}$ | $i_{41}$ | $i_{51}$ | $i_{61}$ | $i_{71}$ | $i_{C01}$ | $c_{L01}$ |
| $d_{02}$ | $d_{12}$ | $d_{22}$ | $d_{32}$ | $a_{43}$ | $a_{53}$ | $a_{63}$ | $a_{73}$ | $a_{C23}$ | $d_{L01}$ |
| $e_{02}$ | $e_{12}$ | $e_{22}$ | $e_{32}$ | $b_{43}$ | $b_{53}$ | $b_{63}$ | $b_{73}$ | $b_{C23}$ | $e_{L01}$ |
| $i_{02}$ | $i_{12}$ | $i_{22}$ | $i_{32}$ | $c_{43}$ | $c_{53}$ | $c_{63}$ | $c_{73}$ | $c_{C23}$ | $i_{L01}$ |

FIG. 7

| L9 | DESCRIPTION |
|---|---|
| $K_{01}$ | TRUE VALUE OF CONTROL BIT PARITY |
| $K_{01}'$ | COMPLEMENT OF CONTROL BIT PARITY |
| $f_{L01}$ | FIRST BIT OF 4B CODED ERROR LOCATING FIELD |
| $g_{L01}$ | SECOND BIT OF 4B CODED ERROR LOCATING FIELD |
| $h_{L01}$ | THIRD BIT OF 4B CODED ERROR LOCATING FIELD |
| $j_{L01}$ | FOURTH BIT OF 4B CODED ERROR LOCATING FIELD |

FIG. 9

$o_0 = e_0$ $o_1 = e_1 + e_0$ $o_2 = e_2 + e_1 + e_0$ $o_3 = e_3 + e_2 + e_1 + e_0$ $o_4 = e_4 + e_3 + e_2 + e_1$ $\vdots$ $o_n = e_n + e_{n-1} + e_{n-2} + e_{n-3}$ $o_{n+1} = x + e_n + e_{n-1} + e_{n-2}$ $o_{m-1} = x + x + e_n + e_{n-1}$ $o_m = x + x + x + e_n$

ERROR CORRECTION WITH LOW LATENCY FOR BUS STRUCTURES

FIELD OF THE INVENTION

The present invention relates to communication systems and, more particularly, relates to error correction in communications systems with bus structures.

BACKGROUND OF THE INVENTION

Error correction was once reserved for environments where probability of error was high, such as communication between two wireless devices. Now, however, error correction is being applied to environments where the probability of error is relatively low, such as communication between two servers communicating through some parallel or serial connection.

One particular type of error correction used in the latter situation is transmission codes complemented with additional parity information. Transmission codes basically take an uncoded data vector, which has a number of values, and create a coded data vector that is larger than the uncoded data vector. For instance, in a 5B/6B transmission code, a coded data vector having six bits is created from an uncoded data vector having five bits. The sixth bit is generally selected so that a property of the coded data vector will obey certain rules. The property is called the "balance" of the data vector, and errors in received data vectors are determined by whether the balance of a received data vector fits within the rules.

There are instances where an error or errors occur in a coded data vector such that the received version of the coded data vector will meet balance requirements and meet the rules at the location, in a data stream, of the error and a rule violation is detected only later in the data stream. Thus, techniques are required for determining errors in coded data vectors earlier in the data stream.

SUMMARY OF THE INVENTION

The present invention provides techniques for error correction. The present invention may be used, for instance, to provide low latency for bus structures and to determine errors in data vectors that are encoded earlier in a data stream.

In a first aspect of the invention, correction information is determined from a number of data vectors. Location information is also determined from the data vectors. The location information comprises values determined from subsets of the data vectors. Two or more of the subsets have one or more data vectors in common, but also have one or more data vectors, in one or more of the subsets, that are not in other subsets. The correction information and location information may be used to correct one or more errors in a data vector, and may be beneficially used for a number of data lanes connecting two devices, where some or all of the data lanes are used to communicate the data vectors.

The location information may be determined based on balance parameters corresponding to the data vectors in the subsets. Additionally, each subset may comprise a number of groups of data vectors. The data vectors may be assigned some order and the groups may be even numbered or odd numbered, based on the order, groups of data vectors. Values of location information may correspond to different size groups, wherein each size is a function of a power of two, such that the groups may comprise one data vector, two data vectors, four data vectors, and so on, for as many values of location information desired. A number of values of the location information may be determined by a number of the data lanes used to transmit data vectors.

Location information may be determined from received data vectors and compared with received location information. When the received location information and determined location information differ, the errors between the sets of information may be used to determine which one of the received data vectors has an error or errors. The correction information may be used to correct the error in the data vector having the error.

The correction information may comprise parity values, each parity value determined by using a value in a particular location of each of the data vectors. For instance, the first bit of each of the data vectors may be used to determine a first parity bit for the correction information.

The determined correction information may be compared with received correction information. An error in a data vector may be corrected by determining which location of the determined correction information has a value that is different than a value in the received correction information. This location has a corresponding location in the data vector and the value in the corresponding location may be modified in order to correct the error in the data vector.

The data vectors, the correction information, and the location information may comprise an array. The correction information may comprise one or more vectors and the location information comprises one or more vectors.

The data vectors may be transmitted over a number of data lanes, the correction information may be transmitted over one or more data lanes, and the location information may be transmitted over one or more data lanes. The data vectors, correction information, and location information may be coded using one or more transmission codes. In an exemplary embodiment, K-bits for control characters are coded using transmission codes, the location information is coded using transmission codes, and the resultant coded vectors are transmitted over a data lane.

In another aspect of the invention, a lane assignment module can switch a number of first lanes to a number of second lanes. The lane assignment module comprises a number of multiplexers, each multiplexer adapted to couple a subset of first lanes to one of the second lanes. Each subset of electrical lanes is assigned an order. Each optical lane of the plurality of optical lanes is assigned an index. The multiplexers corresponding to optical lanes in a range adjacent to the index of the failed optical line select, using the order, a different electrical lane than that currently selected.

A more complete understanding of the present invention, as well as further features and advantages of the present invention, will be obtained by reference to the following detailed description and drawings.

BRIEF DESCRIPTION OF THE DRAWINGS

FIG. 4 is a table illustrating an exemplary correction array in accordance with one embodiment of the present invention;

FIG. 5 is a block diagram of an example illustrating how balance parameters of data vectors might be used to determine values in a location vector, in accordance with one embodiment of the present invention;

FIG. 6 is a table illustrating an example of how the correction array of FIG. 4 can be transmitted over ten data lanes, in accordance with one embodiment of the present invention;

FIG. 7 is a table illustrating an example of a split coded vector having both bits for correcting control characters and bits containing a location vector, in accordance with one embodiment of the present invention;

FIG. 9 is an exemplary table illustrating possible lane assignments used in multiplexers, in accordance with one embodiment of the present invention.

DETAILED DESCRIPTION OF PREFERRED EMBODIMENTS

Figure 1:
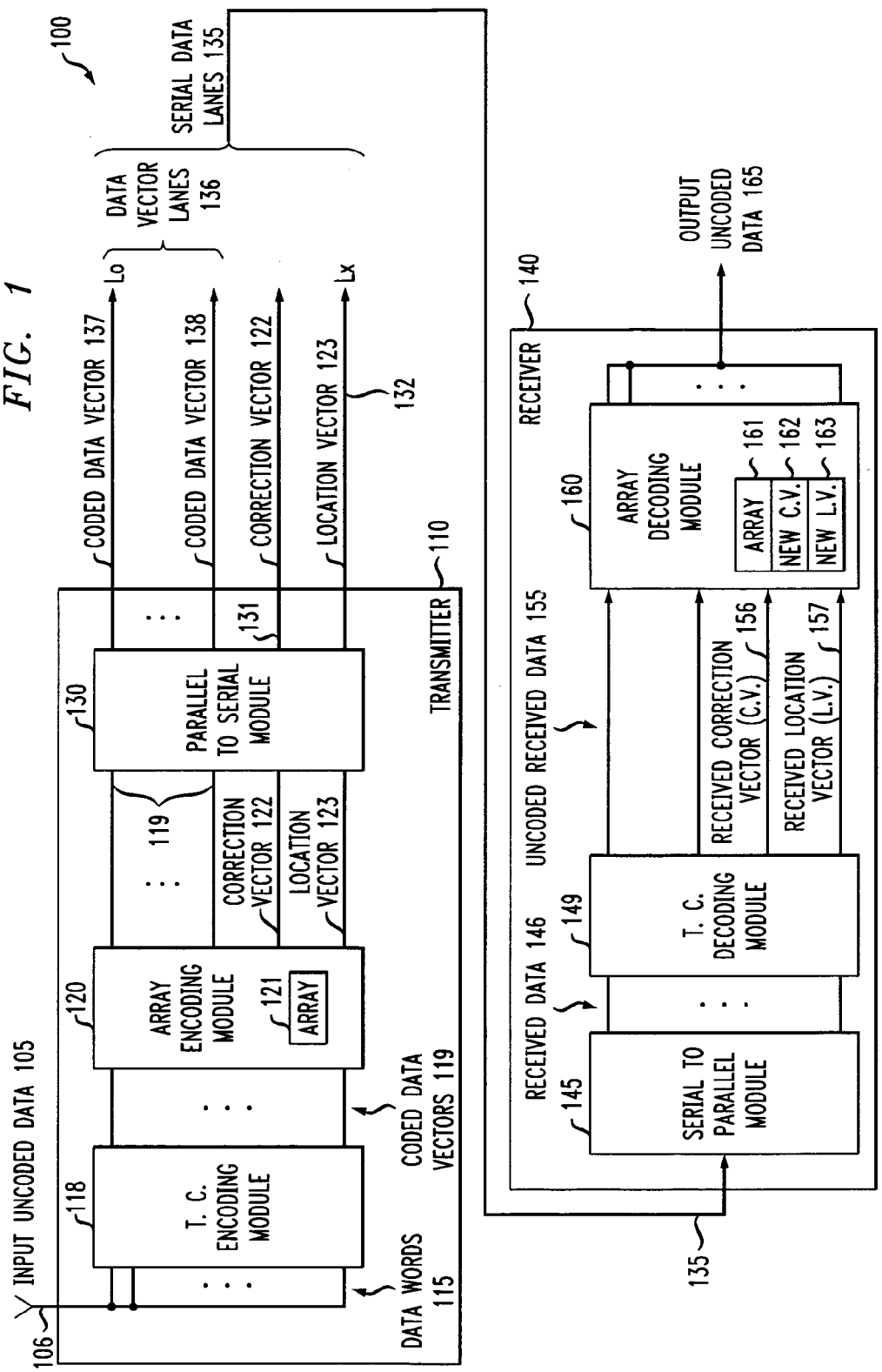
FIG. 1 is a block diagram of an exemplary communication system in accordance with one embodiment of the present invention.

Some of the longer bus structures for server interconnections require optical transmission media operating over dozens of fibers in parallel at rates of several giga-baud. In contrast to longer distance communications links, which are designed with protocols to routinely take care of an occasional error, these longer bus structures must operate virtually error free. Because of latency considerations which affect system performance, normal error handling procedures are generally not applicable. Optical links are typically specified with an error rate of $10^{-12}$ or better, but the longer bus structures for server interconnections require an error rate several orders of magnitude lower. This reduction in error rate can be accomplished by error correction.

An example of an error correction scheme providing reduced error rates is given in "Proposal for a Very Short Reach (VSR) OC-192/STM-64 Interface based on Parallel Optics," Optical Internetworking Forum (OIF) (1999), the disclosure of which is hereby incorporated by reference. However, the technique described in this proposal is usually not suitable for server links primarily because of excessive systematic latency, which is more than 240 serial baud intervals, not counting Cyclic Redundancy Check (CRC) and correction operations. Also, the overhead becomes excessive and the effectiveness is reduced to relatively poor levels for applications with a significantly larger number of links.

By contrast, aspects of the present invention have a systematic latency as low as the time required to launch a single serialized coded vector (e.g., typically six baud intervals), can readily be expanded to many lanes, are constructed with generally simpler circuits and give orders of magnitude better error protection.

Aspects of the present invention may generally be applied to bus structures having a number of parallel lanes, each of the parallel lanes transmitting serial data at high data rates. A bus structure for use herein should provide simple, low latency communication between chips on separate package entities, such as would be used by two communicating servers, and is suitable, among other applications, for the following applications:

1. Links with a distance of about two meters or less for which an error is a serious interruption. Low latency and freedom from errors over the life of the equipment are high priorities.

2. Links with a distance of about 10 meters or less, which include upstream buffering and support to gracefully recover from occasional errors. Low error rates and low latency are still very important but somewhat less critical.

The present invention is intended for many different applications, but the preceding two applications are common applications where the present invention can be applied to provide suitable error reduction.

The expected errors are uncorrelated single bit errors and the native error rate without correction is already low. Well designed optical lanes in good working order are believed to exhibit these characteristics.

The bus structure is typically a few tens up to hundreds of lanes wide and the operating rate is several gigahertz (GHz). For reliability, it is desirable to have spare lanes, which can be switched into use to replace any lane with elevated error rates before a complete failure.

The present invention may beneficially provide correction information that can be used to correct a data vector having an error. Additionally, location information is provided that can be used to locate the data vector with the error. The location information, in an embodiment, is designed so that the data vector with the error can be quickly ascertained, with low latency. In an embodiment, the location information has a number of values, and each value is determined from a subset of the data vectors. Each subset will have some data vectors in common with other subsets, but will have data vectors not in other subsets. Because each value of the location information is determined from subsets having some common data vectors and some data vectors different than those in other subsets, a location of a data vector having an error can easily be determined.

Referring now to FIG. 1, an exemplary communication system 100 is shown. Communication system 100 comprises a transmitter 110 and a receiver 140 coupled by a number of serial data lanes 135. Transmitter 110 comprises a transmission code encoding module 118, an array encoding module 120, and a parallel to serial module 130. Array encoding module 120 comprises a correction array 121. Receiver 140 comprises a serial to parallel module 145, a transmission code decoding module 149, and an array decoding module 160. Array decoding module 160 comprises a correction array 161, a new correction vector 162, and a new location vector 163. Each transmitter 110 and receiver 140 is a communication unit adapted to provide array encoding and decoding, respectively, along with transmission coding and decoding, respectively.

Figure 2:
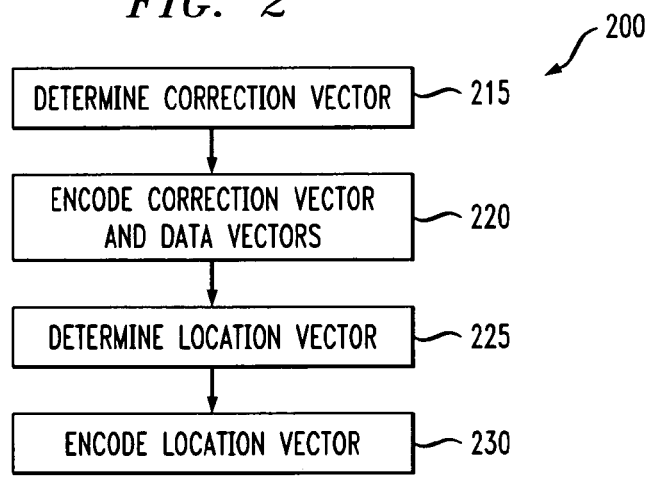
FIG. 2 is a flowchart of an exemplary method for encoding data for transmission, in accordance with one embodiment of the present invention.

Input uncoded data 105 is applied to the transmission code encoding module 118 through a parallel data bus 106. Each group of data will be called a "data word" 115 herein. The transmission code encoding module 118 converts the data words 115 into coded data vectors 119, using one or more transmission codes. For instance, if there are 20 parallel data bits in data words 115, the transmission code encoding module 118 can create, if using a 5B/6B transmission code, four coded data vectors 119, each coded data vector 119 having six bits. The array encoding module 120 stores a predetermined number of the coded data vectors 119 in correction array 121. The array encoding module 120 determines a correction vector 122 and a location vector 123, which can be added to the correction array 121. An exemplary correction array 121 having coded data vectors 119, a correction vector 122 and a location vector 123 is shown in FIG. 4 and is described in additional detail below. A method suitable for use by the transmitter 110 in order to process the correction array 121 and determine information suitable for correcting errors in the correction array 121 is shown in FIG. 2.

It should be noted that the correction vector 122 and location vector 123 are also generally encoded. Such encoding could be performed by the array encoding module 120 or by the transmission code encoding module 118 or by any suitable mechanism.

The correction array 121 is then coupled to the parallel to serial module 130 The parallel to serial module 130 takes a number of vectors, including the correction vector 122 and location vector 123 and places them on serial data lanes 135. The serial data lanes 135 comprises a number of data vector lanes 136, a lane 131 carrying the correction vector 122, and a lane 132 carrying the location vector 123. In this example, the correction vector and location vector are each assigned a lane from the serial data lanes 135. However, this does not have to be the case, as described in more detail below. In this example, there are a number of coded data vectors 137 through 138 that are transmitted on the data vector lanes 136. An example of how coded data vectors 119, correction vector 122, and location vector 123 could be transmitted over serial data lanes 135 is shown in reference to FIG. 6.

The serial data lanes 135 are coupled to the receiver 140. During transmission or reception, errors could be introduced in the data traveling over or being determined from serial data lanes 135. Serial data lanes 135 are generally high speed serial lanes and comprise a bus structure used to interconnect two devices.

The serial to parallel module 145 converts data on serial data lanes 135 to parallel data, referred to as received data 146. The transmission code decoding module 149 applies one or more transmission codes to received data 146. The transmission code decoding module 149 communicates any code violations in the received data 146 to the array decoding module 160. The transmission code decoding module 149 also communicates the uncoded received data 155, including the received correction vector and the received location vector, to the array decoding module 160. The array decoding module 160 stores received uncoded data 155 from the transmission code decoding module 149 in the correction array 161.

Figure 3:
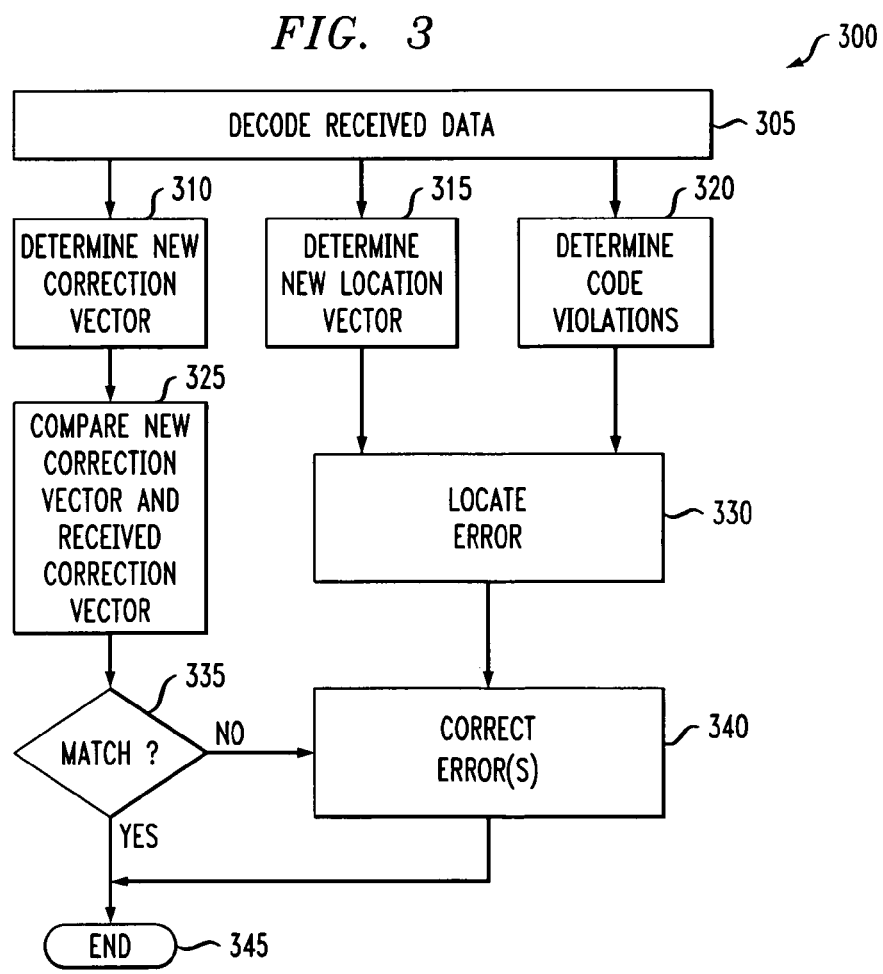
FIG. 3 is a flowchart of an exemplary method for decoding data, in accordance with one embodiment of the present invention.

The array decoding module 160 determines a new correction vector 162 and a new location vector 163. A method suitable for use by a receiver 140 in order to correct errors in a received correction array 153 is shown in FIG. 3. The new correction vector 162 and new location vector 163 are compared with the received correction vector 156 and received location vector 157 (e.g., received over lanes 131 and 132, respectively). Using these comparisons, the array decoding module 160 can correct errors in a data vector received over serial data lanes 135 and stored in correction array 161. As described in more detail below, there are certain conditions for which no correction should be performed.

Whether correction has or has not been performed, the array decoding module 160 generally outputs the "corrected" uncoded data vectors 155 as output uncoded data 165.

It should be noted that the transmitter 110 and the receiver 140 can be combined into a single transceiver adapted to transmit and receive data vectors over two sets of serial data lanes 135 (e.g., one in each direction). It should be noted that the serial data lanes 135 could also be a single lane, and a correction array would be sent on the single lane. Additionally, some of the serial data lanes 135 can be used as spare data lanes in case one or more of the data lanes 135 fails. Furthermore, when high speeds are desired, the array coding and transmission code coding can be performed in parallel to some extent. For example, the transmission code encoding module 118 and array encoding module 120 can perform functions in parallel in order to meet high speeds. In general, the location vector 123 should be created after the data vectors in the correction array 121 have been coded.

Turning now to FIG. 2, a method 200 is shown for encoding data for transmission. Method 200 will generally be performed by transmitter 110, although any device adapted to perform method 200 is suitable. Generally, method 200 uses a correction array of data vectors, where a correction array is defined in more detail below. However, method 200 may be performed on any type of data for which error correction is desired.

In general, the values transmitted on multiple serial data lanes are partitioned into correction arrays of size $b \cdot m \cdot n$, where m is the number of transmission lanes and n is the number of values in a coded, serially transmitted vector. Usually each value is a bit. For a 5B/6B coded vector, n=6. The parameter b indicates the number of contiguous vectors from each lane included in the array, usually b=1.

Each array is assigned a correction vector which is also coded and sent along, usually on a dedicated lane. In step 215 of FIG. 2, the correction vector is determined. In the correction vector, the first bit is defined as the parity of the first bit of all data vectors in the array except vectors which are assigned solely to the location vector, because, in general, the location vector will not have its parity added to the correction vector. However, the location vector can be added to the parity calculation for the correction vector, if desired. The second bit of the parity vector is the parity of all second bits of all the data vectors and so on. It is immaterial whether the parity chosen is even or odd. Also, the correction vector may use other techniques instead of parity, such as CRC. However, parity is generally easy to calculate and can be determined very quickly. In step 220, the correction vector is encoded using one or more transmission codes. Additionally the data vectors are also encoded using one or more transmission codes. The determination of the correction vector in step 215 and the encoding of the data vectors in step 220 can take place, at least in some extent, in parallel.

In transmission codes, there are special non-data vectors, commonly referred to as "control characters." A K-bit in the uncoded domain identifies a vector as something other than data. If control characters have to be restored, a parity bit based on all the K-bit values should be sent along as well. If control characters are used only for startup functions, it may be possible to eliminate this extra bit, or the extra bit may be transmitted on a spare lane if the spare lane is not used. In this case, the capability to restore control characters is lost if a payload lane is switched to the spare lane.

Transmission bandwidth must also be available for one or more data location vectors. There may also be one or more spare data lanes for alternate routing of a failing lane. Alternatively, a data lane used to transmit location vectors may also serve as a spare lane. In that case, the ability to correct errors is reduced but not totally incapacitated in the case of a failing lane. The coded vectors should have the property that a single transmission error either generates an invalid vector or changes a parameter associated with the vector. All vectors of the following codes meet this requirement: U.S. Pat. No. 4,486,739, by Franaszek and Widmer, entitled "Byte Oriented DC Balanced (0,4) 8B/10B Partitioned Block Transmission Code" (1984), U.S. Pat. No.

6,198,413, by Widmer, entitled "Partitioned DC Balanced (0,6) 16B/18B Transmission Code with Error Correction" (2001), and U.S. patent application Ser. No. 10/091,673, by Widmer, entitled "DC-Balanced 7B/8B, 9B/10B, and Partitioned DC-Balanced 12B/14B, 17B/20B, and 16B/18B Transmission Codes," the disclosures of which are hereby incorporated by reference.

For the balanced vectors or vectors having a disparity of ±2 in transmission codes such as 3B/4B, 5B/6B and partitioned 8B/10 and 10B/12B codes, a significant parameter is the balance of the vector. The disparity of a vector is the difference between the number of ones and zeros in the vector. Positive and negative disparity numbers refer to an excess of ones or zeros, respectively. An unbalanced coded vector has a disparity that is not zero while a balanced coded vector has a disparity that is zero. If a coded vector is balanced at the transmission end, a single error will generate an unbalanced vector at the receiving end, and the unbalanced vector may or may not be valid. If the vector is unbalanced at the transmission end, a single error will either generate an invalid vector or a balanced vector. In this example, a balance parameter can be chosen such that coded data vectors having a disparity of ±2 cause the balance parameter to be assigned one value, such as zero, while balanced coded vectors cause the balance parameter to be assigned another value, such as one.

The vectors used in transmission codes such as 7B/8B, 9B/10B, and partitioned 16B/18B codes have a disparity of 0, ±2 or±4. A significant parameter is whether the vector has a disparity of ±2 or not. A single error changes a disparity of ±2 into a disparity of 0 or ±4, an initial disparity 0 into a disparity of ±2, and a disparity of ±4 into a disparity of ±2 or an invalid vector is generated. In this example, a balance parameter can be chosen such that coded data vectors having a disparity of ±2 cause the balance parameter to be assigned one value, such as one, while coded data vectors having a disparity of ±4 cause the balance parameter to be assigned another value, such as zero.

Although the balance parameter will be described herein based on the disparity of data vectors, any parameter that changes when an error occurs in a data vector may be used.

The balance parameter is used to determine one or more location vectors in step 225. For purposes of reference, all coded data vectors are assigned a number from 0 to bm and grouped in binary fashion (e.g., a function of a power of two): singles, pairs, quartets, groups of eight and so on. The groups are also numbered in consecutive order.

In step 225, a parity value, generally a bit able to have a binary value, is generated for subsets of balance parameters corresponding to data vectors, where each subset comprises one or more groups of data vectors. In the following examples, the parity value is assumed to be a bit, but it is possible for the parity to be extended to larger values such as hexadecimal values. The parity bit is calculated on the value of the balance parameter described above for either the odd or even numbered groups of data vectors only, wherein "odd" and "even" are determined by the assigned consecutive order. For instance, a first parity bit is derived from the parity calculated on the balance parameters corresponding to all odd numbered data vectors. A second parity bit is calculated on the value of the balance parameters corresponding to all vectors belonging to an odd numbered pair (e.g., two contiguous data vectors) of data vectors. A third parity bit is calculated on all the balance parameters corresponding to all vectors belonging to an odd numbered quartet of data vectors, and so on. These parity bits constitute the location information, which is coded into a one or more location vectors, depending on array size, and transmitted along with the correction vector and the coded data vectors in the array. An exemplary location vector and its determination are described in additional detail in reference to FIG. 5.

With the above numbering system, it is beneficial to compute the location parities on subsets of data vectors assigned odd numbering, because those subsets will include fewer terms if the total number of lanes is not a power of two. As an example, for a total number of 68 lanes, the highest numbered (i.e., the fifth) set of 16 lanes includes only four elements (lanes 64, 65, 66, and 67) and there are only two odd numbered subsets (i.e., 1 and 3). With even numbers, there would be three subsets (i.e., 0, 2, and 4) having even numbers with sixteen elements for which the parities have to be derived.

In step 230, the location vector is encoded by using transmission codes. after step 230, the array is generally transmitted. It should be noted that it is possible for some portion of the array to be transmitted before the correction vector and location vector are completely determined.

The coding and lane assignment for the location vector should be such that an error in the data vectors should not spread into the location vector upon decoding and vice versa, because this could impede the error correction mechanism.

Generally, the number of transmission lanes to be protected is not an integer multiple of the number n of bits in the uncoded vector (e.g., 5 for the case of 5B/6B code). The remainder lanes can be ignored as dummy bits or used for unrelated functions. A good use of the remainder lanes is as an extension of the location vector, especially when using 5B/6B code. The five uncoded bits of a single vector can locate errors only in 32 or fewer lanes not counting the K-bit parity. In such situations, it can be useful to split the 5B/6B vector with a remainder into a 3B/4B and a 1B/2B part, one segment containing data and the other error location bits of an error location vector. Any of the 1B/2B codes is compatible with embodiments of the present invention.

At both the transmitting and receiving end, the processing of the location bits used in one or more location vectors takes more time than the correction vector parity and the coding of data vectors transmitted via the data lanes, adding to latency. The excessive delay can be reduced by coding the error location bits for the location vectors in any of the 1B/2B coding varieties if the extra bandwidth is available. 1B/2B coding of the true/complement variety can be implemented with virtually no extra coding and decoding delay.

Referring now to FIG. 3, a method 300 is shown for decoding data in an array. The method 300 is generally performed by receiver 140, although any device suitable for implementing method 300 may be used. Method 300 begins in step 305, when the received data, including the received data vectors, is decoded (step 305). Steps 310, 315 and 320 are generally performed in parallel. In step 310, a new correction vector is determined from the received data vectors. The new correction vector is determined via the techniques described above in reference to step 215 of FIG. 2. The new correction vector is compared with the received correction vector in step 325. If there is a match between the two vectors (step 335=YES), the method 300 ends in step 345. If the two vectors differ (step 335=NO), then the error or errors are corrected in step 340. As described below, if there is a single invalid vector in the data vector portion of an array, the single invalid vector can be corrected by the received error correction vector and its location determined by the location vector.

In step 320, any code violations are flagged so that errors in data vectors are known. In step 315, a new location vector is determined, using the techniques described above in reference to step 225 and below in reference to FIG. 5.

In step 330, the erroneous data vector is located by comparing the received, uncoded location vector with the new location vector derived from the received, uncoded data vectors. This comparison results in determining which data vector has an error. A single error in the coded domain will change a location value for every subset to which the erroneous vector belongs. As an example, an error in bit number nine of a group of 16 bits will change the location values determined from the balance parameters of the odd numbered vectors and the odd numbered groups of eight, but not the location values determined from the balance parameters of the odd numbered pairs and the odd numbered quartets. So a data vector with an error can be uniquely identified. The identification of a data vector having an error is described in more detail in reference to FIG. 5.

According to the above, a single error in the data vector portion identified by an invalid coding vector can be corrected even if there is a second error in the location vector. In step 340, the new and received correction vectors are used to correct the error by determining which value in the new correction vector is wrong and correcting this corresponding bit in the identified data vector. In other words, a single erroneous data vector is corrected in the uncoded domain by changing those bits of the erroneous vector for which the correction vector derived from the received vector does not match the corresponding bits of the received correction vector. For instance, if the received correction vector is 01101 and the new correction vector is 00101, the second bit of the data vector has the error and is inverted.

In step 345, the method 300 ends.

It should be noted that no action is taken in the following instances:

1. The received correction vector is in error, as determined by the transmission code used to decode the received correction vector.

2. Two or more vectors in the data vector portion of the array are in error.

3. The data vector portion of the array contains all valid code vectors and the received location vector is in error, as determined by the transmission code used to decode the received correction vector.

4. The errors are confined to the received location and correction vectors, i.e. outside the data vector portion of the array.

Turning now to FIG. 4, a correction array 400 is shown of the type that might be used for a 5B/6B transmission code. Correction array 400 comprises a data vector portion 410, a correction vector portion 420, and a location vector portion 430. The columns $D_0$ through $D_{m-1}$ represent m uncoded 5-bit data vectors. The columns C and L represent the correction and location vectors, respectively. The bit $A_c$ in the C column is the parity of all data A-bits in the block, $A_0$ through $A_{m-1}$. Similarly, the bit $B_c$ in the C column is the parity of all data B-bits in the block, $B_0$ through $B_{m-1}$.

Assuming a 5B/6B code, each coded data vector in the correction array 400 will either be balanced or unbalanced and the balance parameter (e.g., "BAL") assumes a corresponding value, which is arbitrary as long as the value is consistent. An exemplary technique for determining the location vector 430 is illustrated in FIG. 5 for the case of 21 data vectors. Although not shown in FIG. 4, another row may be added to the correction array 400 in order to hold the coding bits (one bit for each vector for a 5B/6B transmission code).

Turning now to FIG. 5, a block diagram is shown illustrating an example of how a location vector 430 may be determined. Each bit 510 through 530 in the location vector 430 is determined by using a subset 541 through 581, respectively, of the possible 21 data vectors. As shown in the figure, the $A_L$-bit 510 is determined from the parity of all balance parameters associated with the subset 541 of even numbered data vectors $D_0$, $D_2$, $D_4$, . . . , $D_{20}$, where "even numbered" refers to even numbers in the order 540. It should be noted that the order, in terms of what data vector is assigned a particular number in the order, is generally arbitrary. The $B_L$-bit 515 is the parity of all balance parameters associated with the subset 551 of even numbered pairs of data vectors, e.g., $D_0D_1$, $D_4D_5$, $D_8D_9$, . . . , $D_{20}D_{21}$, where the pairs of data vectors are or per order 550. The $C_L$-bit 520 is the parity of all balance bits associated with even numbered quartets of data vectors, e.g., $D_0D_1D_2D_3$, $D_8D_9D_{10}D_{11}$ and $D_{16}D_{17}D$ the quartets are ordered as per order 560 of the subset 561. The $D_L$-bit 525 is the parity of all balance parameters associated with the subset 571 of even numbered octets of data vectors, e.g., $D_0D_1D_2D_3D_4D_5D_6D_7$ and $D_{16}D_{17}D_{18}D_{19}D_{20}D$ per order 570. The $E_L$-bit 530 is the parity of all balance parameters associated with subset 581 of even numbered groups of sixteen vectors, e.g., $D_0D_1D_2D_3D_4D_5D_6D_7D_8D_9D_{10}D_{11}D_{12}D_{13}D_{14}D_{15}$ ordered as per order 580.

The illustration of FIG. 5 may also be used to illustrate how simple it is to use the location vector 430 to determine which data vector has an error. For example, assume that the data vector associated with location nine has an error. The $E_L$-bit 530 of the new location vector (i.e., determined by using the received data vectors) will have a different value as compared to the $E_L$-bit 530 of the received location vector. Using this information, data vectors 16 through 21 are assumed to be error-free and one of the data vectors one through 15 is assumed to have an error. The $D_L$-bit 525 of the new location vector matches the $D_L$-bit 525 of the received location vector. This means that the error is located in data vectors eight through 15. The $C_L$-bit 520 for the new location vector will have a different value than the $C_L$-bit 520 for the received location vector. This means that one of the data vectors eight through 11 contains the error. The $B_L$-bit 515 for the new location vector will have a different value than the $B_L$-bit 515 for the received location vector. This means that one of the data vectors eight or nine contains the error. Because the $A_L$-bit 515 for the new location vector is the same as the $A_L$-bit 515 for the received location vector, the data vector in location nine has the error.

A binary search technique can therefore be used to quickly determine which data vector has the error. Binary searches are quite fast and should allow very fast error correction. It should also be noted that the ordering 540 through 580 is done for exposition. Any ordering may be used as long as suitable values for the location vector 430 are determined.

It can be seen that values in the location vector are determined so that they contain information corresponding to common data vectors but also contain information from data vectors not used to determine other values. For instance, each of the values of the bits 510, 515 is determined by using the common data vector in position zero, but the determination of bit 510 does not use the data vector in location one whereas bit 515 is determined by using the data vector in location one. Thus, the common data vectors used for determination of bits 510 and 515 are the data vectors in positions zero, four, eight, 12, 16 and 20, and there are data vectors included in subset 541 that are not included in subset 551.

Turning now to FIG. 6, a table is shown illustrating an example of how the coded serialized vectors 'abcdei' of a correction array might be transmitted on a number of transmission lanes. The example assumes an input bus width of 20 lines and a serial baud rate at twice the bus rate on 10 optical lanes. For each vector the a-bit is transmitted first and the i-bit (i.e., the bit applied by a 5B/6B transmission code) last. The first subscript for lanes $L_0$ to $L_7$ refers to the lane number and the second subscript to the 20-bit word number. As shown, a first word 610 is transmitted on lanes $L_0$ to $L_3$, a second word 620 is transmitted on lanes $L_4$ to $L_7$ and a third word 630 is transmitted behind word 610 on the first four lanes. In this example, a "word" also contains the five i-bits added during 5B/6B transmission coding.

In this example, word 610 and 620 are included in a single correction array with the associated correction vector 640 (i.e., '$a_{C01}\ b_{C01}\ c_{C01}\ d_{C01}\ e_{C01}\ i_{C01}$') and the locating vector 650 (i.e., '$a_{L01}\ b_{L01}\ c_{L01}\ d_{L01}\ e_{L01}\ i_{L01}$'). The locating vector 650 is transmitted with some delay (three serial bit intervals in this example) to allow sufficient time for processing which takes more time than all the other vectors. Since there are only eight data vectors in the correction array of this example, only three locating bits are required which could be encoded in the 3B/4B format. In the example of FIG. 6, the location vector contains an extra two bits (i.e., '$d_{L01}\ e_{L01}$') and is encoded using the 5B/6B transmission code. If it is required that control characters are also restored, an extra correction bit is required for the control bit K, which is the parity of all K values in the correction array. The K bit indicates whether a vector is coded as data or control information. This bit would then be transmitted on lane $L_9$ using the two remaining coded bit positions. The control bit K could be coded in 1B/2B format (e.g., Manchester coding, which transmits each bit in true and complement form). Obviously, a single error in this 2-bit field can be instantly detected. An error in the 3B/4B coded locating bits cannot affect any other bits and vice versa which is important for the integrity of the correction scheme. FIG. 7 shows an example of the location vector 650 where the control bit K is encoded in Manchester coding and the three locating bits are encoded in the 3B/4B format.

Any of the balanced transmission codes of the cited references above is compatible with the error correction technique of this disclosure, which is illustrated using the 5B/6B code as an example.

The error location lane in 5B/6B code can handle up to 32 lanes, ignoring the parity for the K-bit. For more lanes, an additional location lane can be added, or unused bit positions in the data field as described above can be reclaimed for error location purposes.

If the available bandwidth is tight, use of a 7B/8B code could be considered. The 7 bits of a location vector encoded via a 7B/8B code can handle up to 128 lanes, or 64 lanes including the K-bit. A similar but larger expansion is possible by adopting the 10B/12B format, but this will generally add to latency and may reduce the granularity which can result in larger remainders.

Another possibility is to stick with 5B/6B code and redefine the correction array by selecting a parameter value b=2 as defined earlier. The correction array then comprises two vectors from each lane. The correction vector is still a single 5B/6B vector computed over all 5-bit source vectors in the correction array. The correction vector might alternate with a data vector or a location vector on a single lane. Another lane can accommodate two error location vectors, more than enough to handle any number of lanes.

The present invention, thus, allows errors in data vectors to be corrected. It can be determined, using techniques of the present invention, that one or more lanes consistently cause errors. It is then possible to switch lanes so that the lane or lanes creating the errors are transferred to other lanes and letting the lane or lanes causing errors to be unused.

Figure 8:
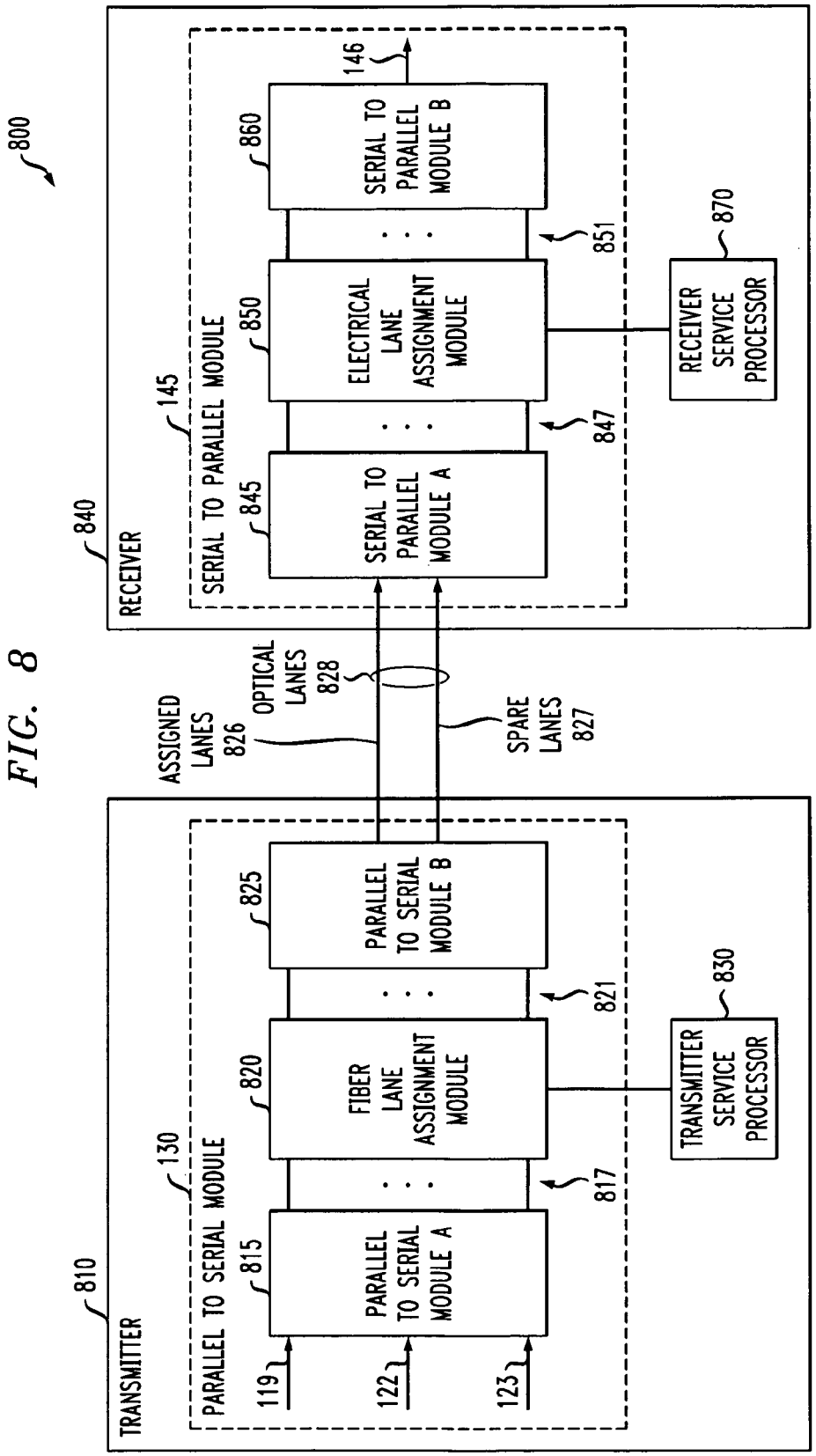
FIG. 8 is a block diagram of an example of a communication system that can change lane assignments based on the failure of one or more lanes connecting two devices, in accordance with one embodiment of the present invention.

Referring now to FIG. 8, a communication system 800 is shown. Communication system 800 can switch to spare lanes when the communication system 800 determines that one or more lanes consistently have errors.

Communication system 800 comprises a transmitter 810 and receiver 840 communicating through optical lanes 828. Optical lanes 828 are the serial data lanes 135 of FIG. 1. Transmitter 810 is a modified version of transmitter 110 of FIG. 1. Specifically, the transmitter 810 comprises a transmitter service processor 830 and a modified parallel to serial module 130, which comprises a parallel to serial module A 815, a fiber lane assignment module 820, and another parallel to serial module 825. It is to be understood that the transmitter 810 also comprises a transmission code encoding module 118 and an array encoding module 120, although these are not shown for simplicity. Receiver 840 is a modified version of receiver 140 of FIG. 1. Specifically, receiver 840 comprises a receiver service processor 870 and a modified serial to parallel module 145, which comprises serial to parallel module A 845, an electrical lane assignment module 850, and a serial to parallel module B 860. It is to be understood that receiver 840 also comprises a transmission code decoding module 149 and an array decoding module 160, which are not shown for simplicity. It is also to be understood that, in this example, the optical lanes 828 comprise a number of assigned lanes 826 and a number of spare lanes 827.

The parallel to serial module A 815 serializes the input vectors 119, 122, and 123 to a rate comparable with an electrical bus rate. The electrical interface data 817 is then a number of serial lanes operating at or an integral fraction of the full serial rate of the optical lanes 828. The electrical interface data 817 are coupled to the fiber lane assignment module 820, which connects electrical interface data 817 to optical interface data 821. Each optical interface lane 821 is directed to a specific optical lane 828. Each optical interface lane 821 is an electrical lane that will be converted to optical sometime before transmission on optical lanes 828. The parallel to serial module B 825 feeds the full set of optical lanes 828 including the spare lanes 827. The parallel to serial module B 825 is present if the rate of the electrical interface lanes 817 is only a fraction of the optical rate of optical lanes 828 and the parallel to serial module B 825 then serializes to the optical rate. Thus, the parallel to serial module B 825 performs the final serialization, if needed, to the full optical rate. The fiber lane assignment module 820 has also an input from the transmitter service processor 830, which selects the assignments.

If the parallel to serial module B 825 is present, the serial to parallel module A 845 is also present and deserializes optical lanes 828. Complementary blocks are added at the receiving end. A serial to parallel module A 845 deserializes the optical lanes 828 to a rate compatible with electrical circuits, for instance standard CMOS gates, and the serial to parallel module A 845 produces a number of optical interface lanes 847. The optical interface lanes 847 are coupled to the electrical lane assignment module 850, which connects the optical interface lanes 847 to the appropriate electrical interface lanes 851 under the direction of the receiver service processor 870. Whereas at the transmitter 810 end, each optical interface lane 821 can receive data from several electrical interface lanes 817, at the receiver 840 end each electrical interface lane 851 can receive data from several optical interface lanes 847 in an arrangement which is complementary to the transmitter 810 end. The electrical lane assignment module 850 feeds, via a number of electrical interface lanes 851, the serial to parallel module B 860, which completes the deserialization.

If one or more assigned optical lanes 826 exceed a specified error rate or are inoperable, the assigned optical lanes 826 may be substituted by spare optical lanes 827. It is shown below how this can be done in an efficient manner without excessive gating and wiring complexity.

It is proposed that spare optical lanes 827 are not dedicated to a particular optical or fiber component, but are assigned more efficiently to the total pool of optical lanes 828 processed by an electronic unit, as represented, for example, by a CMOS chip. So a few spare optical lanes 827 are assigned to a large number of optical lanes 828. The solution presented below avoids potential wiring problems.

It is assumed that service processors 830, 870 at the transmitter and receiver system level are made aware of the status of all optical lanes 828 and control the assignments of these optical lanes 828. Each optical lane 828 can accept input from several, but limited number of electrical inputs via multiplexers, which are beneficially implemented in standard CMOS technology. Since the parallel electrical interface (e.g., parallel to serial module A 815 and serial to parallel module B 860 along with transmission coder encoders and decoders and array encoders and decoders) operates typically at the limit of a given technology and the serial baud rate on the optical lanes 828 is higher, the multiplexers cannot be placed right into the full rate path which would require the smallest circuit area. For the 5B/6B case operating at twice the word rate described in the examples above, the preferred multiplexer for each optical interface lane 821 is two bits wide and placed into the half-rate stream 817 and 821 which is subsequently merged into a full rate serial stream 828. A set of three spare lanes requires for each multiplexed bit a set of four 2-way AND gates followed by a 4-way OR circuit commonly referred to as AO2222. A register controlled by the transmission service processor 830 activates one of the four AND gates.

Assume a set of serialized electrical lanes $e_0$ to $e_n$ (i.e., electrical interface lanes 817 or 847) feeding fiber-optic lanes $o_0$ to $o_m$ (i.e., optical lanes 828) where m>n. Note that each fiber optic lane 828 corresponds to an optical interface lane 821 or 847 in this example. The difference m−n=s is equal to the number of spare lanes s. Each electrical lane can be directed via a multiplexer to any one of s+1 electrical lanes. For s=3, the lanes can be selected as indicated by the logical OR function (+) as shown in FIG. 9. Each of the lines of FIG. 9 represents a single multiplexer implemented by, for example, the fiber lane assignment module 820 or electrical lane assignment module 850. The letter "×" in the last four lines of FIG. 9 is a place holder to simplify the description of alternate paths. The electrical lanes are listed in order of how the optical lanes generally couple to the electrical lanes.

If any optical lane 826 is taken out of operation, all optical lanes 828 with a higher index number are connected to the electrical lane listed as second choice. If a second lane is out, all optical lanes with an index higher than the second bad lane are connected to the electrical lane listed as third choice and so on. In other words, optical lane $o_4$ starts coupled to electrical lane $e_4$ but then will be coupled to $e_3$ should one of the optical lanes $o_0$ through $o_3$ be taken out of operation. Each higher optical lane $o_5$ to $o_{n+1}$ will also switch.

As an example, if optical lanes $o_0$, $o_1$, and $o_2$ are out of operation, the electrical lane $e_0$ is directed to the optical lane $o_3$ with the index 0+3=3, $e_1$ is directed to optical lane $o_4$, and so on.

It should be noted that the technique may be modified so that an optical lane is switched lower in order instead of higher in order.

A specific example of optical lane assignments will now be given. Assume a 100 bit wide bus operating at 3 GBaud connected to three optical modules with a total of 72 fibers operating at 6 Gbaud with 5B/6B code. The data transmission requires 3×20 optical lanes. The remaining bandwidth is assigned to error correction and spare lanes as follows:

1. Short error correction blocks comprising just a single input word of up to 100 data bits coded into twenty 6B vectors on 20 optical data lanes are defined. The small correction array size reduces the chance that a correction array contains two erroneous vectors. The parity circuits comprise fewer terms and so there is less circuit delay. The more efficient larger blocks made up of several words also incur waiting times at both the transmitter and receiver equal to a word interval for each word included.

2. Beside the correction parity lane, two additional optical lanes in each block are allocated for error locating purposes for each correction array. The two lanes transmit six bits in Manchester code for reduced circuit delay in the critical path. Five of these bits can locate erroneous vectors on up to 32 lanes and the sixth bit is the parity of the control bits K.

3. Serial transmission at twice the word rate requires three blocks of 23 lanes each.

4. The remaining three lanes are spare lanes which can be substituted for any three faulty lanes out of the 72 lanes.

The overall allocation of the 72 optical lanes is thus as follows:

1. Three spare lanes.
2. Three error correction arrays of 23 lanes, consisting of up to 20 data lanes, 2 lanes with error location vectors, and 1 lane carrying the error correction vector.

It is to be understood that the embodiments and variations shown and described herein are merely illustrative of the principles of this invention and that various modifications may be implemented by those skilled in the art without departing from the scope and spirit of the invention.

What is claimed is:

1. A method for use in a communication system for processing a plurality of data vectors, the method comprising the steps of:
    determining correction information from the plurality of data vectors; and
    determining location information from the plurality of data vectors, the location information comprising a plurality of location information values wherein:
        the location information values are determined from subsets of the data vectors,
        at least two of the subsets have one or more data vectors in common but wherein one or more of the at least two subsets has one or more data vectors not in another of the at least two subsets,
        each of the at least two subsets comprises at least two data vectors, and
        the correction information and location information may be used to correct one or more errors in the plurality of data vectors.

2. The method of claim 1, further comprisng the step of comparing received correction information with the determined correction information.

3. The method of claim 2, further comprising the step of using the location information to determine which data vector of the plurality of data vectors has one or more errors.

4. The method of claim 3, further comprising the step of using the correction information to correct the data vector having the one or more errors.

5. The method of claim 4, wherein each data vector comprises a plurality of data vector values, wherein the step of comparing received correction information with the determined correction information further comprises the step of determining which of one or more locations in the determined correction information have an incorrect value, and wherein the step of using the correction information to correct the data vector having the error further comprises the step of changing a data vector value or data vector values in the data vector having the error, wherein the changed data vector value or data vector values have one or more locations corresponding to the one or more locations in the determined correction information having the incorrect value.

6. The method of claim 1, further comprising the step of comparing received location information with the determined location information.

7. The method of claim 6, further comprising the step of using the location information to determine which of the plurality of data vectors has one or more errors when the received location information does not match the determined location information.

8. The method of claim 1, wherein each data vector comprises data vector values and the correction information comprises a plurality of correction information values, and wherein each of the data vector values, correction information values, and location information values is a binary value.

9. The method of claim 1, wherein the plurality of data vectors are assigned a consecutive order and wherein the subsets are defined by odd numbered groups of data vectors.

10. The method of claim 1, wherein the plurality of data vectors are assigned a consecutive order and wherein the subsets are defined by even numbered groups of data vectors.

11. The method of claim 1, wherein the subsets are defined by groups of data vectors, wherein each group has a size, and wherein each size is a function of a power of two.

12. The method of claim 11, wherein the groups are assigned a consecutive order for each power of two and wherein each location information value is determined from groups having sizes corresponding to a single power of two.

13. The method of claim 1, wherein the step of determining location information from the plurality of data vectors further comprises the step of determining the location information values from balance parameters corresponding to data vectors in the subsets.

14. The method of claim 13, wherein the subsets are defined by groups of data vectors, and wherein the step of determining the location information values from balance parameters corresponding to data vectors in the subsets further comprises the step of determining the location information values from balance parameters corresponding to data vectors in the groups.

15. The method of claim 1, wherein the plurality of data values, correction information, and location information are stored in a correction array.

16. The method of claim 1, wherein the correction information comprises one or more vectors and wherein the location information comprises one or more vectors.

17. The method of claim 1, wherein each data vector comprises a plurality of data vector values, wherein the correction information comprises a plurality of correction information values, and wherein step of determining correction information from the plurality of data vectors further comprises the step of determining each correction information value from a parity corresponding to one or more of the data vector values.

18. The method of claim 17, wherein each data vector value and each correction information value have locations, and wherein each parity is determined from one of a plurality of selected locations in each of the data vectors.

19. The method of claim 17, further comprising the steps of applying one or more transmission codes to the plurality of data vectors, correction information, and location information.

20. The method of claim 19, further comprising the steps of coupling a portion of the plurality of data vectors to a plurality of first data lanes, coupling the correction information through a second data lane, and coupling the location information to a third data lane.

21. The method of claim 1, wherein the data vectors have been encoded using one or more transmission codes and wherein the location information is determined from a property of each of the data vectors in the subsets.

22. The method of claim 21, wherein the property is a binary property of the encoded data vectors, the binary property changing when a single bit in the coded vector is changed.

23. The method of claim 1, further comprising the steps of determining a parity bit corresponding to K-bit values of vectors other than data, and using binary coding to code the parity bit.

24. The method of claim 1, wherein the plurality of data vectors have had one or more transmission codes applied to the plurality of data vectors, and wherein the method further comprising the steps of:
  determining any code violations, according the one or more transmission codes, in the plurality of data vectors;
  locating a data vector having one or more errors by using the location information; and
  correcting the one or more errors by using the correction information.

25. A communication unit for use in a communication system for processing a plurality of data vectors, the communiation unit comprising:
  a coding device adapted to:
  determine correction information from the plurality of data vectors; and
  determine location information from the plurality of data vectors, the location information comprising a plurality of location information values, wherein:
    the location information values are determined from subsets of the data vectors,
    at least two of the subsets have one or more data vectors in common but wherein one or more of the at least two subsets has one or more data vectors not in another of the at least two subsets,
    each of the at least two subsets comprises at least two data vectors, and
    the correction information and location information may be used to correct one or more errors in the data vectors.

26. The communication unit of claim 25, further comprising an array encoding module, the array encoding module adapted to apply one or more transmission codes to the plurality of data vectors, correction information, and location information.

27. The communication unit of claim 25, further comprising an array decoding module, the array encoding module adapted to apply one or more transmission codes to the plurality of data vectors, correction information, and location information and to determine code violations, if any, in the plurality of data vectors, correction information, and location information.

28. The communication unit of claim 25, wherein the coding device is further adapted to compare received correction informtion with the determined correction information and to correct one or more errors in a data vector by using the comparison of the reeived and determind correction information.

29. The communication unit of claim 25, wherein the coding device is further adapted to compare received location information with the determined location information and to determine which one of the plurality of data vectors contains one or more errors by using the comparison of the received and determined location information.

30. A communication unit for use in a communication system for rerouting lanes, the communication unit comprising:
a lane asignment device coupled to a plurality of first lanes and to a plurality of second lanes, the lane asignment device comprising a plurality of multiplexers, each multiplexer adapted to couple a second lane to a subset of the plurality of first lanes, wherein each first lane is assigned a first index and each second lane is assigned a second index, each of the first and second indexes having an index value associated therewith, wherein the lane assignment device is adapted to reroute, by using the multiplexers, first lanes have first index values in a range of index values near a selected first index value to second lanes having second index values in a range of index values near a selected second index value, corresponding to the selected first index value, and hving corresponding ones of the second index values changed by a predetermined value from previous values of the corresponding ones of the second index values.

31. The communiation unit of claim 30, wherein each first lane is an electrical interface lane and wherein each second lane is an optical interface lane.

32. The communication unit of claim 30, wherein each subset of first lanes corresponds to a number of consecutive second lanes, and wherein the subsets corresponding to consecutive second lanes overlap for all except one first lane per pair of second lanes.

33. The communiation unit of claim 30, further comprising a processor, wherein each second lane is coupled to an optical lane, wherein the processor is adapted to detrmine when an optical lane fails by determining when the optical lane is greater than a predetermined error rate or is out of service, and wherein the processor controls the lane assignment device in order to switch first lanes based on the determination that the optical lane has failed.

34. The communication unit of claim 30, wherein the predetermined value is one, wherein the range of index values near the first index value is a range of index values including and greater than the selected first index value, wherein the range of index values near a selected second index value is a range of index values greater than the selected second index value.

35. The communication unit of claim 30, wherein the predetermined value is a negative one, wherein the range of index values near the first index value is a range of index values including and less than the selected first index value, wherein the range of index values near a selected second index value is a range of index values less than the selected second index value.

* * * * *

UNITED STATES PATENT AND TRADEMARK OFFICE
CERTIFICATE OF CORRECTION

PATENT NO. : 6,978,416 B2
DATED : December 20 2005
INVENTOR(S) : Widmer

It is certified that error appears in the above-identified patent and that said Letters Patent is hereby corrected as shown below:

Column 18,
Line 3, before "corresponding" and after "and" replace "hving" with -- having --.

Signed and Sealed this

Twenty-fifth Day of April, 2006

JON W. DUDAS
*Director of the United States Patent and Trademark Office*